United States Patent [19]

Nakamura et al.

[11] Patent Number: 5,194,180

[45] Date of Patent: Mar. 16, 1993

[54] IONICALLY CONDUCTIVE MATERIAL AND METHOD FOR ITS PREPARATION

[75] Inventors: Takashi Nakamura, Chiba; Manshi Ohyanagi, Shiga, both of Japan

[73] Assignee: Toray Silicone Co., Ltd., Tokyo, Japan

[21] Appl. No.: 404,706

[22] Filed: Sep. 8, 1989

[30] Foreign Application Priority Data

Sep. 16, 1988 [JP] Japan .................................. 63-231956

[51] Int. Cl.$^5$ ............................................. H01B 1/00
[52] U.S. Cl. .................................................. 252/500
[58] Field of Search ................................ 252/518, 500

[56]  References Cited

U.S. PATENT DOCUMENTS

| | | | |
|---|---|---|---|
| 3,560,544 | 2/1971 | Haluska | 260/448.2 |
| 3,703,489 | 11/1972 | Morehouse | 260/2.5 AH |
| 3,957,843 | 5/1976 | Benneett | 260/448.2 B |
| 4,072,655 | 2/1978 | Louis et al. | 260/46.56 |
| 4,855,077 | 8/1989 | Shikinami et al. | 252/518 |
| 4,906,718 | 3/1990 | Gornowicz et al. | 528/15 |
| 4,990,360 | 2/1991 | Gornowicz et al. | 427/35 |

FOREIGN PATENT DOCUMENTS

| | | |
|---|---|---|
| 216463 | 10/1985 | Japan . |
| 217263 | 10/1985 | Japan . |
| 209169 | 9/1987 | Japan . |
| 142061 | 6/1988 | Japan . |

OTHER PUBLICATIONS

"Poly(Dimethylsiloxane)–Poly(Ethylene Oxide) Based Polyurethane Networks Used As Electrolytes in Uthium Electrochem. Solid State Battteries"–Bouridah et al. *Solid State Ionics* 15 (1985) 233–240.

"Conductivity of Solid Complexes of Lithium Perchlorate With Poly {[ω-Methoxyhexa(Oxyethylene)Ethoxy]Methylsiloxane}" Fish et al. Makromol Chem. 7 (1986) 115–120.

"Ionic Conductivity in Solid, Crosslinked Dimethylsiloxaneethylene Oxide Copolymer Networks Containing Sodium" Adaimic et al. 1986.

"Ion Conductivity in Polysiloxane Comb Polymers with Ethylene Glycol Teeth" Polymer Communications 1986.

*Primary Examiner*—Mark L. Bell
*Assistant Examiner*—Alan Wright
*Attorney, Agent, or Firm*—John L. Chiatalas

[57]  ABSTRACT

The present invention relates to an ionically conductive material formed of (A) organopolysiloxane having at least two carboxyl group-containing hydrocarbon groups in each molecule, (B) polyoxyalkylene having at least two hydroxyl groups in each molecule, and, (C) metal ion from Group I or Group II of the Periodic Table, wherein said metal ion is dispersed in the aforesaid crosslinked copolymer.

5 Claims, No Drawings

IONICALLY CONDUCTIVE MATERIAL AND METHOD FOR ITS PREPARATION

BRIEF DESCRIPTION OF THE INVENTION

The present invention relates to an ionically conductive material and a method for its preparation.

BACKGROUND OF THE INVENTION

The field of electronic devices, such as batteries, display elements (ECD, and the like), etc., continues to see increasing progress in terms of achieving high performance levels, size reduction, and thickness reduction. Accompanying this, the ionically conductive materials used in these devices have certainly also met high performance levels as well as various high-level requirements such as solidification, high reliability, high flexibility, high moldability, and moisture resistance, among others.

In this context, the following ionically conductive materials are already known:

(i) electrolyte solutions consisting of electrolyte dissolved in water, aqueous solvent, or organic solvent,
(ii) inorganic solid electrolytes such a beta-alumina (beta-$Al_2O_3$), lithium nitride ($Li_3N$), lithium iodide-alumina ($LiI-Al_2O_3$), and rubidium/silver iodide, etc., and
(iii) solid electrolytes consisting of the solution or dispersion of the salt of a Group I or Group II metal in a macromolecular resin matrix.

However, with regard to the electrolyte solutions of category (i), due to the use in this material of a liquid such as water or organic solvent, the problem generally arises of leakage to the exterior of the electronic device, and this leakage is entirely capable of causing deterioration in device performance and damage to neighboring parts. In order to ameliorate these problems, ionically conductive material has also been prepared in paste or gel form by the admixture of polymer compounds into such electrolyte solutions. However, even these materials cannot completely eliminate the risk of leakage. The solid electrolyte materials of category (ii) can basically be used in high-reliability long-life electronic devices, and, in addition, these materials can fulfill the requirements of size and thickness reduction. However, the current situation prevailing in this category is that materials cannot be obtained which have a satisfactory conductivity at room temperature, and these materials have not reached the level of widespread practical application. The solid electrolytes of category (iii) not only essentially solve the leakage problem, as for category (ii) materials, but because they impart desirable properties associated with organic polymers, such as high flexibility and high moldability, they have received attention as materials which can meet the extensive demands of electronic devices as listed above. In this regard, the following properties are required of polymeric ionically conductive materials which are to be used in solid electrolytes:

(i) The quantity of dissolved electrolyte (metal salt) must reach suitably high levels, and the capacity for ionic dissociation must be high.

(ii) The dissociated ions must be mobile in the polymer matrix. In the area of polymer structures which satisfy these conditions, crosslinked materials containing polyether segments, such as polyethylene oxide (PEO), etc., have been the subject of various investigations due to their relatively good conduction properties. However, limitations do arise on molecular mobility in simple crosslinked PEO homopolymer, and a satisfactory conductivity at room temperature is not obtained for this substance. In order to provide improvement in this area, investigations have been carried out on the synthesis of solid electrolytes which combine the PEO segment and the siloxane segment with its very high molecular mobility. For example, Japanese Patent Application Laid Open [Kokai] Numbers 60-216463 [216,463/85], 60-217263 [217,263/85], and 63-142061 [142,061/88] describe ionically conductive materials in which the lithium ion, etc., is dispersed in a crosslinked copolymer of PEO and siloxane bonded by the Si—O—C bond. However, since the Si—O—C bond is readily broken in the presence of water, the handling of such materials is very troublesome. In Solid State Ionics, Volume 15, p. 233 (1985), an ionically conductive material containing dispersed metal ion is disclosed in which polysiloxane with polyethylene glycol side chains is crosslinked and solidified using difunctional isocyanate. However, in this case, in order to obtain solidification up to a satisfactory strength level, the NCO group must be added in a suitable excess relative to the OH group. When this material is placed in a device such as a battery, the residual NCO groups pose the risk of reaction with the electrode material, thus raising problems for practical application. In addition, with regard to methods for the preparation of siloxane/PEO crosslinked materials, Japanese Patent Application Laid Open Number 62-209169 [209,169/87] lists crosslinking by means of exposure to radiation (electron beams, etc.) as well as through a platinum catalyst-mediated hydrosilylation reaction. This publication also discloses ionically conductive material prepared by dispersing metal ion in these materials. Analyzing these methods and considering first the use of platinum catalyst, the platinum remains in the system: not only can the obtained solid electrolyte not be used in display elements since it develops color, but the risk arises of a reduction in carrier ion (e. g., lithium ion) mobility. In the case of radiation crosslinking, while the preceding problems can be eliminated, this method has not achieved practical application due to its very high associated equipment costs.

Thus, the solid electrolytes based on crosslinked substances from polysiloxane and another polymer material which have been introduced up to the present time suffer from problems with their properties or method of preparation, and are not satisfactory for practical application in electronic devices as described above.

The present inventors carried out extensive research in order to solve the problems under consideration, and discovered as a result that a material, consisting of the dispersion of particular metal ions in a particular crosslinked copolymer, has an excellent ionic conductivity while lacking the problems described above. The present invention was achieved based on this discovery.

The present invention takes as its object the introduction of an ionically conductive material which is ideally suited for use as a solid electrolyte in electronic devices such as batteries, display elements, etc., as well as the introduction of a method for the preparation of said ionically conductive material.

DETAILED DESCRIPTION OF THE INVENTION

The present invention relates to an ionically conductive material characteristically comprising (A) organopolysiloxane having at least two carboxyl group-containing hydrocarbon groups in each molecule and (B) polyoxyalkylene having at least two hydroxyl groups in each molecule, and, (C) metal ion from Group I or Group II of the Periodic Table, wherein said metal ion is dispersed in the aforesaid crosslinked copolymer.

To explain this in greater detail, the organopolysiloxane comprising component (A) becomes the main element constituting the crosslinked copolymer of the ionically conductive material of the present invention. In order to form this crosslinked copolymer, each molecule of this component must contain at least two carboxyl group-containing hydrocarbon groups. It is preferred that the ratio between siloxane units carrying such carboxyl group-containing hydrocarbon groups and other siloxane units fall within the range of 0.01 to 100.

The molecular structure of this component may be any of straight chain, branched, cyclic, network, and three-dimensional; however, from the perspective of ease of formation of the crosslinked copolymer, it is preferred that at least half be straight-chain or branched. Its molecular weight is not critical, but, again for ease of preparation as well as in order to obtain a moderate hardness for the crosslinked copolymer, values in the range of 200 to 900 are preferred.

The carboxyl group-containing hydrocarbon groups of component (A) are exemplified by groups as represented by the general formula $$HOOC-R^4-$$ 

(wherein $R^4$ = alkylene groups having 1 to 8 carbon atoms such as methylene, ethylene, propylene, butylene, pentylene, hexylene, heptylene, and octylene, etc., as well as arylene groups having 6 to 20 carbon atoms such as phenylene and naphthylene, etc.). Carboxyalkyl groups are preferred among these, and carboxypropyl groups are particularly preferred. Other than carboxyl group-containing hydrocarbon groups, organic groups in component (A) are exemplified by alkyl groups such as methyl, ethyl, propyl, etc.; aryl groups such as phenyl, tolyl, naphthyl, etc.; and aralkyl groups such as benzyl, phenethyl, etc. The silicon-bonded groups may also include small quantities of hydrogen atoms and alkoxy groups. From the vantage points of economics and the ability to develop favorable crosslinked copolymers, it is preferred that methyl comprise at least half the number of silicon-bonded organic groups. Examples of organopolysiloxanes within the present context are trimethylsiloxy-terminated methylcarboxypropylsiloxane-dimethylsiloxane copolymers and trimethylsiloxy-terminated methylcarboxypropylsiloxane-methylphenylsiloxane copolymers.

Various methods are known for the synthesis of such organopolysiloxanes. In one such method, the cyclics obtained by cohydrolysis of cyano group-containing organodichlorosilane and organodichlorosilane not containing the cyano group are stirred in acidic aqueous solution in order to develop a ring-opening polymerization while converting the cyano groups to carboxyl groups (Polymer Communications, 26. 249 (1985)).

The polyoxyalkylene comprising component (B) is a crosslinking agent for the aforesaid component (A). In order to function as a crosslinking agent, it must contain at least 2 hydroxyl groups in each molecule. While the molecular structure and chemical structure of this component are not crucial, such considerations as ease of formation of the crosslinked copolymer, etc., establish a preference for polyoxyalkylene having hydroxyl groups at the molecular chain terminals as represented by the general formula $$HO-(R^1O)_n-H$$ 

(wherein $R^1$ is an alkylene group and n is an integer with a value of 1 to 100). $R^1$ in the preceding polyoxyalkylene formula consists of alkylene groups having 1 to 8 carbon atoms such as methylene, ethylene, propylene, butylene, pentylene, hexylene, heptylene, etc. n must fall within the range of 1 to 100, and preferably falls within the range of 5 to 20.

While component (B) comprises polyoxyalkylene having at least two hydroxyl groups in each molecule as above, when an even higher ionic conductivity is required, this polyoxyalkylene preferably contains polyoxyalkylene having the hydroxyl group at only one molecular chain terminal, as represented by the general formula $$HO-(R^2O)_m-R^3$$ 

(wherein $R^2$ is an alkylene group, $R_3$ is an alkyl or aryl group, and m is an integer with a value of 1 to 100).

This polyoxyalkylene having hydroxyl at only one molecular chain terminal undergoes a condensation reaction with component (A) and acts to form a polyoxyalkylene graft chain in the crosslinked copolymer. When a number of these graft chains are present in the present invention, the ionic conductivity tends to be improved. Considering this polyoxyalkylene with hydroxyl at only one molecular chain terminal, $R^2$ in its formula is an alkylene group as above, while $R^3$ is an alkyl group having 1 to 8 carbon atoms, for example, methyl, ethyl, propyl, etc., or an aryl group having 6 to 20 carbon atoms such as phenyl, naphthyl, etc.

The ionically conductive material of the present invention consists of metal ion from Group I or Group II of the Periodic Table as component (C) plus crosslinked copolymer obtained by reaction of the above-described components (A) and (B). Nevertheless, because this crosslinked copolymer is formed principally by an esterification reaction between the carboxyl groups in component (A) and hydroxyl groups in component (B), reaction means can be employed as known in the art for the reaction between carboxyl and hydroxyl groups, for example, reaction methods which are implemented at room temperature or with heating using an esterification reaction catalyst such as a Lewis acid, etc.

Component (C) is the agent which provides or imparts ionic conductivity. Its identity is not crucial as long as it belongs to Group I or Group II of the Periodic Table. Metal ions in this regard are exemplified by metal ions such as lithium, sodium, potassium, calcium, magnesium, etc. Among these, the lithium ion is preferred in order to obtain a high energy density per unit volume or unit quantity. Also, when the ionically conductive material of the present invention is used, for example, in a battery, it will be necessary to select the same ion as in the particular electrode material used (for example, use of the lithium ion when the battery electrode is lithium).

This component (C) as a general rule takes the form of a metal salt. While any type of metal salt can be used, lithium perchlorate ($LiClO_4$), lithium fluoroborate ($LiBF_4$), lithium hexafluorophosphate ($LiPF_6$), lithium trifluoromethanesulfonate ($LiCF_3SO_3$), lithium iodide (LiI), etc., are preferred in order to obtain higher ionic conductivities.

With regard to this component's quantity of dispersion, it is preferred that the ratio between the number of moles of salt [S] (for example, [$LiClO_4$]) and the number of moles of oxyalkylene groups in the crosslinked copolymer [RO], or [S]/[RO], fall within the range of 0.005 to 0.25, and values for this ratio of 0.01 to 0.05 are even more preferred. At values of [S]/[RO] in excess of 0.25, obtaining a homogeneous dispersion of the metal salt becomes problematic, while it becomes difficult to obtain high ionic conductivities at values below 0.005.

The ionically conductive material of the present invention is readily prepared by combining the known technical means used in general esterification reactions between carboxyl-containing compounds and hydroxyl-containing compounds with known technical means for dispersing metal salt in a polymeric material. As an example of these, one can list methods in which a Lewis acid (e.g., sulfuric acid, hydrochloric acid, etc.) is added to the mixture of components (A) plus (B); the crosslinked copolymer of components (A) and (B) is then prepared by running an esterification reaction at room or elevated temperatures; the product is then swelled in organic solvent; and component (C) is admixed and dispersed. One can also list methods in which a Lewis acid is added to the mixture of components (A) through (C) and crosslinking is then carried out by running an esterification reaction on this mixture, thus carrying out the dispersion of component (C) at the same time as the preparation of the crosslinked copolymer of components (A) and (B). The following method of preparation is preferred for the preparation of ionically conductive material according to the present invention.

Said method of preparation consists of heating the following mixture in the presence of an esterification catalyst:

(A) organopolysiloxane having at least two carboxyl group-containing hydrocarbon groups in each molecule, (B) polyoxyalkylene having at least two hydroxyl groups in each molecule in a quantity such that the ratio between the number of moles of hydroxyl groups in the instant component and the number of moles of carboxyl groups in component (A) has a value of (1:10) to (10:1), and (C) salt of a metal from Group I or Group II of the Periodic Table at 0.5 to 20 weight parts for each 100 weight parts of the total quantity of components (A) plus (B).

To explain the preceding in greater detail, the component (A) and component (B) used here are the same as the components (A) and (B) discussed above for the description of the ionically conductive material.

With regard to the blending proportion for component (B), the ratio between the number of moles of hydroxyl groups in this component and the number of moles of carboxyl groups in component (A) should fall within the range of (1:10 ) to (10:1) and preferably falls within the range of (1.0:1.2) to (1.2:1.0). The esterification reaction will develop and a solidified crosslinked copolymer can be obtained at any ratio between components (A) and (B). However, when the ratio between the number of moles of carboxyl groups in component (A) and hydroxyl groups in component (B) varies over a large scale, there will be a tendency for unreacted carboxyl groups or unreacted hydroxyl groups to remain in the ionically conductive material of the present invention. When such an ionically conductive material is used in, for example, a battery, one can anticipate the development of harmful effects, for example, reaction with the electrode material, etc.

Component (C) is again the same component (C) as discussed above in reference to the description of the ionically conductive material. This component should be blended at 0.5 to 20 weight parts per 100 weight parts of the total quantity of components (A) plus (B). At less than 0.5 weight parts, the ionic conductivity drops to an impractically low level. On the other hand, a homogeneous mixture cannot be obtained in excess of 20 weight parts.

In this method, the mixture of components (A) through (C) is heated in the presence of an esterification reaction catalyst; however, the esterification catalyst used here is not particularly crucial. Useful in this regard are those esterification catalysts which are used in general esterification reactions between carboxyl group-containing compounds and hydroxyl group-containing compounds, for example, sulfuric acid, hydrochloric acid, nitric acid, etc. Heating is a technical means for accelerating the esterification reaction as well as removing the water by-product simultaneously generated by the esterification reaction. As a general rule, the temperatures here do not exceed 150 degrees Centigrade.

As a general matter, this crosslinking reaction is advantageously conducted in organic solvent. While the organic solvent used here is not particularly crucial, it should be capable of dissolving or dispersing components (A) through (C) and should not inhibit the esterification reaction between components (A) and (B). Examples of organic solvents in this regard are tetrahydrofuran, dioxane, acetonitrile, dimethylformamide, and dimethyl sulfoxide.

Because this esterification reaction produces water as a by-product, the ionically conductive material of the present invention should be placed under a vacuum as a final measure. A recommended method is as follows: the esterification reaction is first developed to a particular degree at the boiling point of the organic solvent at atmospheric pressure, the organic solvent is then evaporated, and the reaction is subsequently heated in vacuo in order simultaneously to remove the water by-product and complete the esterification reaction.

EXAMPLES

The present invention is explained in greater detail by means of the following illustrative examples.

The ionic conductivity was measured by the following method. The ionically conductive material was formed into a film to provide the measurement specimen. Specimen thickness was measured with a micrometer, and platinum electrodes (circular plates with diameter=1 cm) were attached on both surfaces of the specimen. This entire assembly was installed in a vacuum container capable of measurement at an arbitrary temperature, which was then exhausted to a high vacuum below $10^{-5}$ torr. After the condition of the specimen had satisfactorily equilibrated, a 5 Hz to 13 MHz alternating-current voltage was applied using an LCR meter (model 4192A from Yokogawa Hewlett-Packard), and the conductivity was obtained by complex impedance analysis.

EXAMPLE 1

0.590 g compound (1) as represented below, 0.410 g compound (2) as represented below, 0.1 mg sulfuric acid, and 28.4 mg lithium perchlorate were mixed with 2 ml tetrahydrofuran and this was thoroughly dissolved using ultrasound. This solution was poured into a 3 cm square teflon dish, then heated for 2 hours at 120 degrees Centigrade on a hot plate, and then vacuum-dried for 4 days at 140 degrees Centigrade in a vacuum dryer. The product was a transparent film with a thickness of 0.3 mm. The infrared absorption spectrum of this film was recorded: the peak originating with the hydroxyl group was not observed, while a peak originating with the carbonyl group was located at 1740 $cm^{-1}$. This confirmed that the esterification reaction had proceeded almost to completion. The ionic conductivity of this film was measured, and a value of $5.6 \times 10^{-5}$ S $cm^{-1}$ (25 degrees Centigrade) was obtained. The relationship between the conductivity and temperature at various measurement temperatures is reported in FIG. 1.

$Me_3-SiO-(MeRSiO)_{50}-(Me_2SiO)_{100}-SiMe_3$   Compound (1)

Where $Me=CH_3$ and $R=(CH_2)_3 COOH$

$HO-(CH_2CH_2O)_9-H$   Compound (2)

EXAMPLE 2

0.514 g compound (1) as represented in Example 1, 0.239 g compound (2) as represented in Example 1, 0.247 g compound (3) as represented below, 0.1 mg sulfuric acid, and 33.2 mg lithium perchlorate were mixed with 2 mL tetrahydrofuran, this was thoroughly dissolved using ultrasound, and the thermal drying treatment of Example 1 was subsequently carried out. The product was a transparent film with a thickness of 0.3 mm. A value of $7.8 \times 10^{-5}$ S·cm$^{-1}$ was obtained when the ionic conductivity was measured at 25 degrees Centigrade.

$HO-(CH_2CH_2O)_9-CH_3$   Compound (3)

EXAMPLE 3

0.518 g compound (4) as represented below, 0.482 g compound (1) as represented in Example 1, 0.1 mg sulfuric acid, and 33.4 mg lithium perchlorate were mixed in 2 mL tetrahydrofuran, this was thoroughly dissolved using ultrasound, and a thermal drying treatment was conducted as in Example 1. The product was a transparent film with a thickness of 0.3 mm. A value of $3.2 \times 10^{-5}$ S·cm$^{-1}$ was obtained when the ionic conductivity was measured at 25 degrees Centigrade.

$Me_3-SiO(MeRSiO)_{70}-(Me_2SiO)_{70}-SiMe_3$   Compound (4)

EXAMPLE 4

0.442 g compound (4) as represented in Example 3, 0.274 g compound (2) as represented in Example 1, 0.284 g compound (3) as represented in Example 2, 0.1 mg sulfuric acid, and 31.7 mg lithium perchlorate were mixed with 2 mL tetrahydrofuran, this was thoroughly dissolved using ultrasound, and a thermal drying treatment was conducted as in Example 1. The product was a transparent film with a thickness of 0.3 mm. A value of $7.4 \times 10^{-5}$ S·cm$^{-1}$ was obtained when the ionic conductivity was measured at 25 degrees Centigrade.

EXAMPLE 5

0.530 g compound (1) as represented in Example 1, 0.470 g compound (5) as represented below, 0.1 mg sulfuric acid, and 28.4 mg lithium perchlorate were mixed with 2 mL tetrahydrofuran, this was thoroughly dissolved using ultrasound, and a thermal drying treatment was conducted as in Example 1. A transparent film with a thickness of 0.3 mm was obtained. A value of $1.5 \times 10^{-5}$ S·cm$^{-1}$ was obtained when the ionic conductivity was measured at 25 degrees Centigrade.

Compound (5):

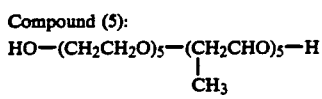
$HO-(CH_2CH_2O)_5-(CH_2CHO)_5-H$
$\phantom{HO-(CH_2CH_2O)_5-(}|$
$\phantom{HO-(CH_2CH_2O)_5-(}CH_3$

EXAMPLE 6

0.590 g compound (1) as represented in Example 1, 0.410 g compound (2) as represented in Example 1, 0.1 mg sulfuric acid, and 28.4 mg lithium trifluoromethanesulfonate were mixed in 2 mL tetrahydrofuran, this was thoroughly dissolved using ultrasound, and a thermal drying treatment was conducted as in Example 1. The product was a transparent film with a thickness of 0.3 mm. A value of $1.8 \times 10^{-5}$ S·cm$^{-1}$ was obtained when the ionic conductivity was measured at 25 degrees Centigrade.

The ionically conductive material of the present invention, because it comprises the dispersion of metal ion as component (C) in a particular crosslinked copolymer composed of components (A) and (B), is characterized by a high ionic conductivity. Also, when applied in electronic devices, etc., it characteristically does not raise the danger of leakage, secondary effects, etc. Accordingly, highly reliable products can be obtained, and a broad range of applications can be contemplated because this material is colorless and transparent. Furthermore, its method of preparation is characterized by simplicity, excellent energy savings, etc., as well as a reduced outlay required for equipment.

That which is claimed is:

1. Method for the preparation of ionically conductive material having the characteristic that a mixture composed of the following is heated to an effective temperature to effect crosslinking in the presence of an esterification reaction catalyst:

(A) organopolysiloxane having at least two carboxyl group-containing hydrocarbon groups in each molecule;

(B) polyoxyalkylene having at least two hydroxyl groups in each molecule, as represented by the general formula

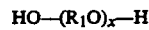
$HO-(R_1O)_x-H$ (wherein $R_1$ is an alkylene group containing 1 to 8 carbon atoms and x is an integer with a value of 1 to 100) such that the ratio between the number of moles of hydroxyl groups in the instant component and the number of moles of carboxyl groups in component (A) has a value of (1:10) to (10:1); and (C) salt of a metal form Group IA or Group IIA of the Periodic Table at 0.5 to 20 weight parts for each weight 100 weight parts of the total quantity of components (A) plus (B).

2. Method for the preparation of ionically conductive materials having the characteristic that a mixture composed of the following is heated to an effective temperature to effect crosslinking in the presence of an esterification reaction catalyst:

(A) organopolysiloxane having at least two carboxyl group-containing hydrocarbon groups in each molecule;

(B) polyoxyalkylene having at least two hydroxyl groups in each molecule, with only one of said two hydroxyl groups being located at a molecular chain terminal, as represented by the general formula

(wherein $R_1$ is an alkylene group containing 1 to 8 carbon atoms, x is a integer with a value of 1 to 100 and $R_2$ is an alkyl group of 1 to 8 carbon atoms or hydrogen) such that the ratio between the number of moles of hydroxyl groups in the instant component and the number of moles of carboxyl groups in component (A) has a value of (1:10) to (10:1); and (C) salt of a metal from Group IA or Group IIA of the Periodic Table at 0.5 to 20 weight parts for each 100 weight parts of the total quantity of components (A) plus (B).

3. Method for the preparation of ionically conductive material of claim 2, wherein the polyoxyalkylene comprising component (B) contains only one of said two hydroxyl groups is located at a molecular chain terminal, wherein $R_2$ is hydrogen.

4. Ionically conductive material comprising metal ions selected from Group IA or Group IIA of the Periodic Table and a crosslinked copolymer obtained by the reaction of:

(A) organopolysiloxane having at least two carboxyl group-containing hydrocarbon groups in each molecule; and (B) polyoxyalkylene having at least two hydroxyl groups in each molecule, as represented by the general formula

(wherein $R_1$ is an alkylene group containing 1 to 8 carbon atoms, x is an integer with a value of 1 to 100 and $R_2$ is an alkyl group of 1 to 8 carbon atoms or hydrogen); and (C) salt of a metal from Group IA or Group IIA of the Periodic Table at 0.5 to 20 weight parts for each 100 weight parts of the total quantity of components (A) plus (B)

wherein said metal ion is dispersed in the aforesaid crosslinked copolymer.

5. Ionically conductive material of claim 4 in which the polyoxyalkylene comprising component (B) contains only one of said two hydroxyl groups located at a molecular chain terminal, wherein $R_2$ is hydrogen.

* * * * *